United States Patent [19]

Starkweather

[11] 4,084,197
[45] Apr. 11, 1978

[54] FLYING SPOT SCANNER WITH SCAN DETECTION

[75] Inventor: Gary K. Starkweather, Saratoga, Calif.

[73] Assignee: Xerox Corporation, Stamford, Conn.

[21] Appl. No.: 772,159

[22] Filed: Feb. 25, 1977

Related U.S. Application Data

[63] Continuation of Ser. No. 625,219, Oct. 23, 1975, abandoned, which is a continuation of Ser. No. 309,873, Nov. 27, 1972, abandoned.

[51] Int. Cl.² .......................... H04N 1/04; H04N 5/76
[52] U.S. Cl. ..................................... 358/300; 358/302; 358/293; 350/6.7; 350/190; 346/108
[58] Field of Search ............... 358/300, 302, 296, 293, 358/285, 206; 350/7, 6, 190; 346/108, 76 L

[56] References Cited

U.S. PATENT DOCUMENTS

| | | | |
|---|---|---|---|
| 2,844,648 | 7/1958 | Rosenthal | 358/293 |
| 3,574,469 | 4/1971 | Emerson | 356/200 |
| 3,597,536 | 8/1971 | Fowler | 350/7 |
| 3,646,568 | 2/1972 | Woywood | 350/7 |
| 3,701,999 | 8/1970 | Congleton | 346/108 |
| 3,750,189 | 7/1973 | Fleischer | 350/7 |
| 3,867,571 | 2/1975 | Starkweather | 358/256 |
| 4,040,096 | 8/1977 | Starkweather | 358/302 |

OTHER PUBLICATIONS

"Laser Raster Scanner with Separated Incident and Reflected Beams;" by D. H. McMurtry; IBM Tech. Disc. Bul.; vol. 14, No. 8, Jan., 1972, pp. 2460-2461.
"Laser Raster Scanner;" by M. R. Latta; IBM Tech. Disc. Bul.; vol. 13, No. 12, May, 1971; pp. 3879-3880.
"Optical Deflector For Non Impact Printing;" by Brown et al; IBM Tech. Disc. Bul.; vol. 13, No. 3, Aug. 1970; pp. 643-644.

*Primary Examiner*—Bernard Konick
*Assistant Examiner*—Alan Faber

[57] ABSTRACT

A flying spot scanning system is provided by utilizing reflected light from a multifaceted rotating polygon which is then directed to the scanned medium. A light source illuminates at least one of the facets of the polygon during each scanning cycle to provide a scanning beam of light. In each scanning cycle, information is transmitted to the scanned medium by modulating the light from the light source in accordance with a video signal. A first cylindrical lens is employed in convolution with other optical elements to focus the scanning beam to a spot in a focal plane at the surface of the medium. Start of scan detection is provided for the synchronization of the scanning cycles by means apart from the scan width on the medium. A portion of the beam at the start of scan position is deflected to impinge upon a second cylindrical lens which focuses the deflected beam to a spot received by a detector element.

5 Claims, 2 Drawing Figures

FLYING SPOT SCANNER WITH SCAN DETECTION

RELATED APPLICATIONS

This application is a continuation of U.S. application Ser. No. 625,219, filed Oct. 23, 1975, now abandoned, which in turn is a continuation of U.S. application Ser. No. 309,873, filed Nov. 27, 1972, now abandoned.

BACKGROUND OF THE INVENTION

This invention relates to a flying spot scanning system for communicating video information to a scanned medium, and more particularly to a scanning system which utilizes a multi-faceted rotating polygon for controlling the scanning cycles.

Much attention has been given to various optical approaches in flying spot scanning for the purpose of imparting the information content of a modulated light beam to a scanned medium. Galvanometer arrangements have been used to scan the light across a document for recording its information content thereon. Such arrangements have included planar reflecting mirrors which are driven in an oscillatory fashion. Other approaches have made use of multifaceted mirrors which are driven continuously. Various efforts have been made to define the spot size in order to provide for an optimum utilization of the scanning system.

In copending U.S. patent application Ser. No. 309,861, filed on Nov. 27, 1972, now U.S. Pat. No. 3,867,571 and assigned to the assignee of the present invention, a flying spot scanning system is provided which does not have constraints imposed upon the spot size and other relationships of optical elements within the system which are not always desirable. As taught therein, a finite conjugate imaging system may be in convolution with the light beam and the rotating polygon. A lens, in series with a convex imaging lens between the light source and the polygon provides this arrangement. The rotation of the polygon is synchronized in a predetermined relation to the scan rate used to obtain the video signal.

In order to determine the scan rate with a correctness and accuracy to insure this predetermined relationship, a suitable start/stop of scan detection scheme must be employed. It is thus an object of the present invention to provide a flying spot scanning system of this type with a start/stop of scan detection arrangement appropriate to achieve the necessary synchronization of elements within the system.

It is a further object of the present invention to provide a spot scanning system which utilizes a multifaceted rotating polygon for controlling scanning cycles.

It is yet another object of the present invention to provide a spot scanning system which provides an effective uniform spot size at the contact loci of the spot with the scanned medium.

It is still another object of the present invention to provide a spot scanning system which assures a minimization of optical distortion through a predetermined synchronization of system elements.

It is another object of the present invention to provide a spot scanning system which utilizes a start/stop of scan detection arrangement which substantially matches the convolution of imaging elements which focus the flying spot at the surface of the scanned medium.

Other objects of the invention will be evident from the description hereinafter presented.

SUMMARY OF THE INVENTION

The invention provides a flying spot scanning system which employs a multifaceted rotating polygon as the element for directing a beam of light to focus to a spot upon a medium and for enabling the spot to traverse the medium throughout a scan width. A light source, such as a laser generates a beam of light substantially orthogonal to the facets of the polygon which illuminated facets in turn reflect the impinging light beam toward the medium in successive scanning cycles. Additional optical elements are provided in convolution with the light source and the polygon to provide a desirable depth of focus of the spot and a sufficient resolution of the optical system.

A feature of the invention is that the beam of light incident upon the multifaceted polygon illuminates a given facet of the polygon during each scanning cycle to provide the desired sequence of spot scanning.

Another feature of the invention is that a very large depth of focus is provided for the spot at the contact loci at the surface of the scanned medium. This feature is provided by utilizing a finite conjugate imaging system in convolution with the light beam and the rotating polygon. A lens in series with a convex imaging lens between the light source and the polygon provides such an arrangement in the tangential plane and the same lenses and a cylinder lens between the polygon and scanned medium provides such an arrangement in the sagittal plane. The lens enables the original light beam to be sufficiently expanded for illuminating a given facet or contiguous facets of the polygon, whereas the imaging lens coverges the expanded beam to be reflected from the polygon to focus at the contact loci on the surface of the scanned medium. Employing such an optical system assures a uniform scan width is traversed by the spot.

Still another feature of the invention is the modulation of the original light beam by means of a video signal. The information content within the video signal is thereby imparted to the light beam itself. The medium to be scanned is one which is responsive to the modulated beam and records its information content as contained within the scanning spot in a usable form on its surface across the scan width.

Yet another feature of the invention is that the rotational velocity of the polygon is synchronized in a predetermined relation to the scan rate used to obtain the video signal.

Also, another feature of the invention is that a start/stop of scan detection apparatus is in combination with and substantially matches the convolution of imaging elements which focus the flying spot at the surface of the scanned medium, although such detection apparatus is spatially distant from the scanned medium.

Another feature of the invention includes an embodiment of the flying spot scanning system for utilization in high speed xerography. The scanned medium in such an embodiment would consist of a xerographic drum which rotates consecutively through a charging station, an exposure station where the spot traverses the scan width of the drum, through a developing station, and a transfer station where a web of copy paper is passed in contact with the drum and receives an electrostatic discharge to induce the transfer of the developed image from the drum to the copy paper. A fusing device then fixes the images to the copy paper as it passes to an output station.

These and other features which are considered to be characteristic of this invention are set forth with particularity in the appended claims. The invention itself, however, as well as additional objects and advantages thereof, will best be understood in the following description when considered in conjunction with the accompanying drawings.

DESCRIPTION OF THE PREFERRED EMBODIMENT

Figure 1:
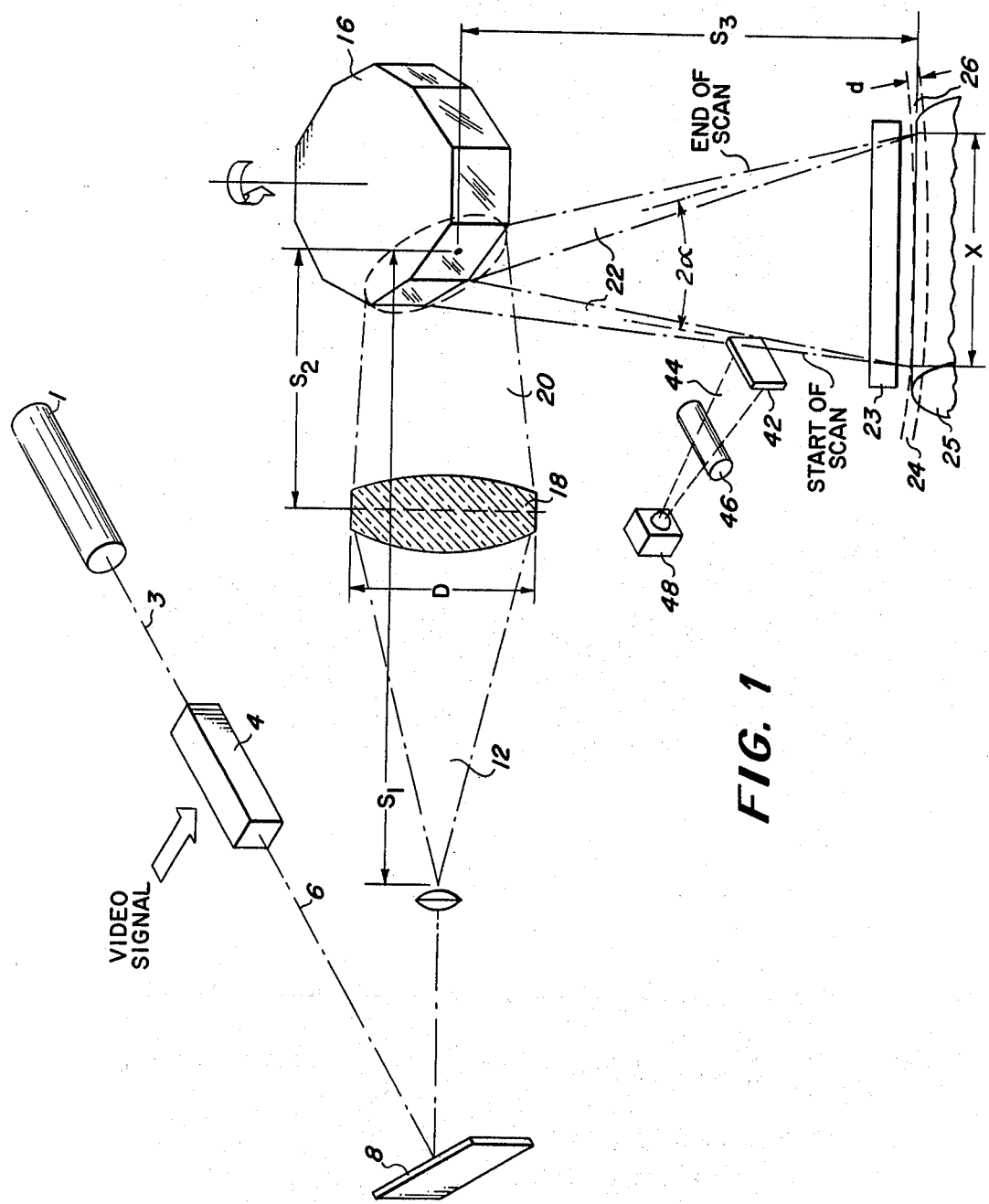
FIG. 1 is an isometric illustration of a flying spot scanning system in accordance with the invention.

In FIG. 1, an embodiment of a flying spot scanning system in accordance with the invention is shown. A light source 1 provides the original light beam for utilization by the scanning system. The light source 1 is preferably a laser which generates a collimated beam of monochromatic light which may easily be modulated by modulator 4 in conformance with the information contained in a video signal.

Modulator 4 may be any suitable electro-optical modulator for recording the video information in the form of a modulated light beam 6 at the output of the modulator 4. The modulator 4 may be, for example, a Pockel's cell comprising a potassium dihydrogen phosphate crystal, whose index of refraction is periodically varied by the application of the varying voltage which represents the video signal. The video signal may contain information either by means of binary pulse code modulation or wide-band frequency code modulation. In any event, by means of the modulator 4 the information within the video signal is represented by the modulated light beam 6.

The light beam 6 is reflected from mirror 8 in convolution with lens 10. The lens 10 may be any lens, preferably of two elements, which elements are in spaced relation to each other such that the external curved surfaces are provided in symmetry with the planar internal surfaces. Preferably the internal surfaces of lens 10 are cemented together to form a common contact zone. Of course, as is often the case in the embodiment of such a lens as a microscope objective, the elements may be fluid spaced. The lens 10 is required to image either a virtual or real axial point of beam 6 through a focal point, for example, on the opposite side of lens 10 for a real image. At the focal point, beam 6 diverges or expands to form beam 12 which would be more than sufficient to impinge upon a given facet of a scanning polygon 16.

At a distance S2 from the leading illuminated facet of polygon 16 is positioned an imaging lens 18. Lens 18 is of a diameter D to cooperate with the expanded light beam 12 to render a convergent beam 20 which illuminates the desired facets to reflect respective light beams 22 through a positive cylindrical lens 23 to focus to the focal plane 24 at a distance S3 from the polygon 16. In this preferred embodiment, imaging lens 18 is a five element compound lens as disclosed in U.S. patent application Ser. No. 130,134 which was filed on Apr. 1, 1971 now U.S. Pat. No. 3,741,621, and assigned to the assignee of the present invention, although a singlet lens could be used.

The rotational axis of polygon 16 is orthogonal to the plane in which light beams 6 travels. The facets of the polygon 16 are mirrored surfaces parallel to the axis of rotation for the reflection of any illuminating light impinging upon them. With the rotation of the polygon 16, assuming two contiguous facets are illuminated at a given time, a pair of light beams 22 are reflected from the respective illuminated facets and turned through an angle 2α for flying spot scanning. Alternatively, flying spot scanning could be provided by any other suitable device, such as mirrored piezoelectric crystals or planar reflecting mirrors which are driven in an oscillatory fashion.

In all of these arrangements, however, the reflecting surfaces would be at a distance S1 from the originating focal point of light beam 12 and preferably in orthogonal relation to the plane bounded by the beam 6 such that the reflected beams would be in substantially the same plane as beam 6.

The cylindrical lens 23 is positioned in the optical path between the polygon 16 and the desired line of scan in the focal plane 24 with its aperture aligned with the aperture of the polygon 16.

The function of the lens 23 is to compensate for runout errors in the scanning system. The lens 23 may be either bi-convex, plano-convex or meniscus and further relates to the scanning system as described in copending U.S. patent application Ser. No. 309,874, filed on Nov. 27, 1972, now abandoned, but refiled as U.S. application Ser. No. 626,167, filed Oct. 28, 1975, now U.S. Pat. No. 4,040,096, and assigned to the assignee of the present invention.

The focal plane 24 is proximate a recording medium 25 whose surface 26 is brought in contact with the respective focal spots of the convergent light beams throughout a scan width x.

A substantially uniform spot size is assured throughout the scan width x even though a curved focal plane 24 is defined throughout the scanning cycle. The lens 10 in convolution with the imaging lens 18 provides a finite conjugate imaging system in the tangential plane and the lens 10, lens 18 and lens 23 are in convolution with each other to provide a finite conjugate imaging system in the sagittal plane. This imaging system allows a large depth of focus d which is coextensive with the contact loci of a spot throughout the scan width x on the surface 26 of the medium 25.

Figure 2:
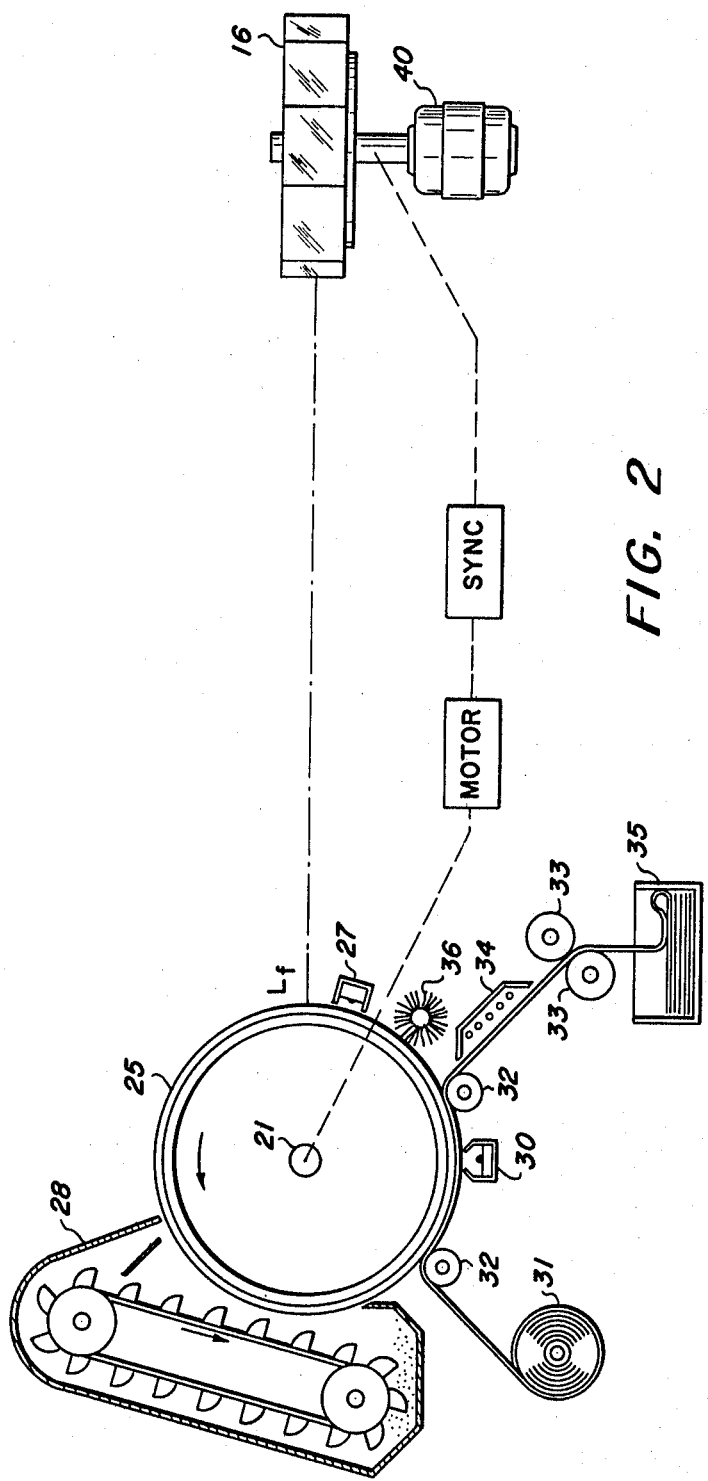
FIG. 2 is a perspective view of the utilization of the scanning beam and embodies additional features of the invention.

As shown in FIG. 2, medium 25 may be a xerographic drum which rotates consecutively through a charging station depicted by corona discharge device 27, exposure surface 26 where the beam from the rotating polygon 16 traverses the scan width x on the drum 25, through developing station 28 depicted by a cascade development enclosure, transfer station 39 where a web of copy paper is passed in contact with the drum 25 and receives an electrostatic discharge to induce a transfer of the developed image from the drum 25 to the copy paper. The copy paper is supplied from the supply reel 31, passes around guide rollers 32 and through drive rollers 33 into receiving bin 35. A fusing device 34 fixes the images to the copy paper as it passes to bin 35.

Usable images are provided in that the information content of the scanning spot is represented by the modulated or variant intensity of light respective to its position within the scan width x. As the spot traverses the charged surface 26 through a given scan angle 2α the spot dissipates the electrostatic charge in accordance with its light intensity. The electrostatic charge pattern thus produced is developed in the developing station 28 and then transferred to the final copy paper. The xerographic drum 25 is cleaned by some cleaning device such as a rotating brush 36 before being recharged by charging device 27. In this manner, the information content of the scanned spot is recorded on a more permanent and useful medium. Of course, alternative prior art techniques, such as microfilm, may be employed to cooperate with a scanned spot in order to utilize the information contained therein.

The polygon 16 is continuously driven by a motor 40 and the scan is synchronized so that the rotational velocity is representative of the information rate used to generate or obtain the original video signal. The rotation rate of the xerographic drum 25 determines the spacing of the scan lines. It also may be preferable to synchronize the drum 25 in some manner to the signal source to maintain image linearity. The source image is reproduced in accordance with the signal and is transferred to printout paper for use or storage.

A specific synchronization scheme may be necessary to avoid the variation of the spot velocity at the focal plane 24 which would otherwise result from the convolution of optical elements configured in this embodiment. The relationship may be one as described in copending United States application No. 309,861 filed on Nov. 27, 1972, now U.S. Pat. No. 3,867,571 and assigned to the assignee of the present invention.

As is further shown in FIG. 1, a mirror 42 is positioned proximate the start of scan location to deflect at least a portion of the beam 22 to direct a beam 44 through a positive cylindrical lens 46 to focus at a detector 48. The detector 48 includes a photodiode (not shown), or other optically sensitive element, which produces an electrical pulse to indicate the start of scan upon illumination by the beam 44. The detector 48 further includes a timing element (not shown) in combination with the optically sensitive element which is responsive to the start of scan pulse. The timing element through well known techniques times out the predetermined duration of a scanning cycle to produce a stop of scan pulse. An example of such a technique would be a capacitive element charged at the start of scan pulse which charge decays in relation to a predetermined time constant to trigger a one-shot multivibrator at the stop of scan. Alternative detector circuitry would be those described in copending U.S. application Ser. No. 309,860, filed Nov. 27, 1972 now U.S. Pat. No. 3,922,485, and assigned to the assignee of the present invention. The start/stop of scan signals are then used to slave the video signal to the scan rate of the scanning system.

The detection elements 46 and 48 are substantially matched with the convolution of imaging elements which focus the flying spot at the surface of the scanned medium. The cylindrical lens 46 is distanced along its respective optical path from the lens 18 precisely at the same length as the cylindrical lens 23 is distanced along its respective optical path from the lens 18. Furthermore, the aperture, focal length, and focal number of the lens 46 is substantially identical to that required for lens 23. Therefore, the focused spot of the beam 44 is in a focal plane at a distance S3 along the optical path from the polygon 16, where the detector 48 is located. Thereby, an effective detection system is provided which contributes to a high degree of synchronization accuracy and constancy, with no interference with the spot scanning elements within the system.

Cylindrical lens 46, in addition to focusing beam 44 at detector 48, increases system speed and provides better print quality by compensating for errors caused by optical scanner inaccuracies and/or misalignments, such as wobble. In particular, cylindrical lens 46 allows a smaller sized detector 48 to be utilized. As the detector required becomes smaller, the capacitance associated therewith decreases, decreasing the detector rise time and thereby increasing the overall speed of the scanning system. Utilizing a spherical lens in place of cylindrical lens 46 will decrease the system scanning speed since it has focusing power in two directions. As discussed in copending U.S. patent application Ser. No. 309,874, filed on Nov. 27, 1972, now abandoned, but refiled as U.S. application Ser. No. 626,167, filed Oct. 28, 1972, now U.S. Pat. No. 4,040,096, and assigned to the assignee of the present invention, utilizing cylindrical lenses, such as lens 46, decreases the effect of the positional errors of scanner 16 (i.e., wobble, tilt) on system operation. If a large wobble is present, cylindrical lens 46 corrects the beam down towards detector 48.

Obviously, many modifications of the present invention are possible in light of the above teaching. It is therefore to be understood that, in the scope of the appended claims, the invention may be practiced other than as specifically described.

What is claimed is:

1. In a scanning mechanism: means for providing a beam of high intensity light, a medium, a start of scan detector located spatially from said medium, means for imaging said beam to a spot at said medium and at said scan detector, scanning means positioned in the optical path of said beam for scanning said beam across said medium, means optically located between said scanning means and said medium in the path of said scanned beam for deflecting a portion of the scanned beam to said scan detector, said imaging means comprising first and second cylindrical lenses, said first cylindrical lens being optically located between said medium and said scanning means and in the path of only the scanned beam directed to said medium, said second cylindrical lens being optically located between said deflecting means and said start of scan detector and in the path of only the deflected scanned beam, said first and second cylindrical lenses being so positioned in the path of the scanned beam that runout errors are substantially corrected at said medium and said scan detector, the plane of no power of said cylindrical lenses being oriented in the direction of scan, said second cylindrical lens being positioned from said start of scan detector at substantially the same optical distance said first cylindrical lens is positioned from said medium, and said second cylindrical lens being optically matched with said first cylindrical lens and having substantially the same focal length and aperture as said first cylindrical lens.

2. The structure as recited in claim 1 further comprising: means for modulating said light beam, said medium being a light sensitive medium.

3. The system as defined in claim 1 wherein the scanning means includes a multifaceted polygon having reflective sides for reflecting the beam onto said medium and means for rotating said polygon such that the reflected beam is scanned in successive traces across said medium.

4. The system as defined in claim 3 wherein said light source is a laser which emits a beam of collimated light of substantially uniform intensity.

5. The structure as recited in claim 4 further comprising: means for modulating said light beam, said medium being a light sensitive medium.

* * * * *